B. F. Neely's Tender for Plows.

117317            PATENTED JUL 25 1871

Witnesses:
Chas. Nidd
Wm. H. C. Smith.

Inventor:
B. F. Neely.
Per
Attorneys.

UNITED STATES PATENT OFFICE.

BENJAMIN F. NEELY, OF YORKTOWN, INDIANA.

IMPROVEMENT IN FENDERS FOR PLOWS.

Specification forming part of Letters Patent No. 117,317, dated July 25, 1871.

*To all whom it may concern:*

Be it known that I, BENJAMIN F. NEELY, of Yorktown, in the county of Delaware and State of Indiana, have invented a new and useful Improvement in Fender for Plows; and I do hereby declare that the following is a full, clear, and exact description thereof, which will enable others skilled in the art to make and use the same, reference being had to the accompanying drawing forming part of this specification, in which—

Figure 1:
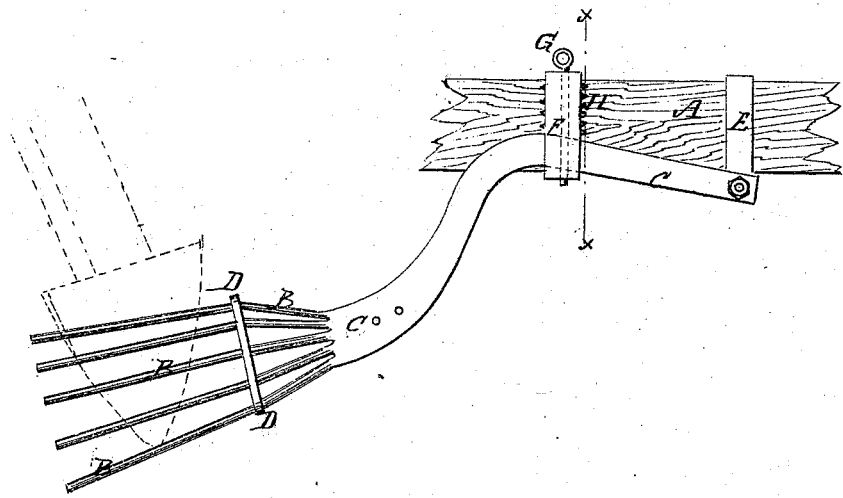
Figure 2:
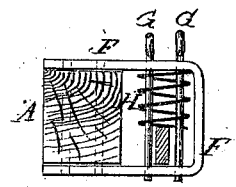

Figure 1 is a side view of my improved fender as attached to a plow-beam. Fig. 2 is a detail vertical section of the same taken through the line *x x*, Fig. 1.

Similar letters of reference indicate corresponding parts.

My invention consists in improving plow-fenders, as hereinafter fully described and subsequently pointed out in the claim.

A is the plow-beam, about the construction of which there is nothing new. B are the fender-teeth or prongs, the forward ends of which are welded or otherwise securely attached to the rear end of the fender-bar C. D is a bar having holes formed in it to receive the teeth B, so that by moving the bar D toward or from the rear end of the bar C the teeth or prongs B may be spread apart or drawn toward each other to allow more or less soil to pass to the plants, as may be desired. The bar D may be replaced, if desired, by an equivalent wire of the requisite stiffness, coiled to form holes or eyes for the passage of the teeth or prongs B. The bar C is curved upward and forward, and its forward end is pivoted to the side of the plow-beam A by means of a band-clip or clevis, E, or other suitable means. F is a strap or clevis, which passes around the beam A, and the middle part of which projects, as shown in Fig. 2, to receive the bar C. The bar C is kept in place laterally, and allowed to move up and down freely by two guide-pins, G, which pass down through holes in the strap F, one upon each side of the bar C. The bar C is held down by the coiled or equivalent spring H interposed between the bar C and the upper arm of the strap F, and which is kept in place by the pins G. By forming several holes in the strap or clevis F for the pins G, the said pins may be adjusted to set the fender in and out, as the size of the plow or other circumstances may require.

By this construction the fender will be held down upon the surface of the ground whether the plow runs deep or shallow, and at the same time will be allowed to yield should it encounter any obstruction.

Having thus described my invention, I claim as new and desire to secure by Letters Patent—

A plow-fender, having a series of elastic teeth, B, combined with a perforated bar, D, movable thereon, to adjust their distance apart and thus graduate the quantity of soil that passes therethrough.

BENJAMIN F. NEELY.

Witnesses:
   CONRAD DIPPEL,
   GEORGE STUMP.